United States Patent
Xu et al.

(10) Patent No.: US 10,287,930 B2
(45) Date of Patent: May 14, 2019

(54) LIGHTWEIGHT ROCKER ARM FRAME AND CURVED CROWN PART FORMING PROCESS THEREOF

(71) Applicant: Hangzhou XZB Tech Co.,Ltd, Hangzhou (CN)

(72) Inventors: Na Xu, Hangzhou (CN); Haijun Ren, Hangzhou (CN)

(73) Assignee: Hangzhou XZB Tech Co., Ltd., Hangzhou (CN)

( * ) Notice: Subject to any disclaimer, the term of this patent is extended or adjusted under 35 U.S.C. 154(b) by 0 days.

(21) Appl. No.: 15/795,253

(22) Filed: Oct. 27, 2017

(65) Prior Publication Data

US 2019/0093522 A1    Mar. 28, 2019

(30) Foreign Application Priority Data

Sep. 25, 2017    (CN) .......................... 2017 1 0872187

(51) Int. Cl.
*F01L 1/18*    (2006.01)
(52) U.S. Cl.
CPC ................. *F01L 1/181* (2013.01); *F01L 1/18* (2013.01); *F01L 2103/01* (2013.01)

(58) Field of Classification Search
CPC .......... F01L 1/18; F01L 1/181; F01L 2103/01
USPC .......................................... 123/90.39, 90.44
See application file for complete search history.

(56) References Cited

U.S. PATENT DOCUMENTS

| | | | |
|---|---|---|---|
| 7,694,659 B2 * | 4/2010 | Ikeda | ...................... F01L 1/185 123/90.39 |
| 2009/0144977 A1 | 6/2009 | Kamiji | |
| 2009/0229124 A1 | 9/2009 | Kawatake | |

* cited by examiner

*Primary Examiner* — Ching Chang
(74) *Attorney, Agent, or Firm* — Gokalp Bayramoglu

(57) ABSTRACT

This invention provides a novel lightweight rocker arm frame and a forming process of a curved crown part thereof, including two sidewalls and two bottom plates. The two sidewalls are connected through the bottom plates respectively located at two ends. A ball socket protruded upwards and an oil hole are arranged at a bottom plate at one end, and a bottom surface of a bottom plate at the other end is a bearing surface. A pin shaft hole is formed in the middle of each sidewall without the bottom plates. According to the rocker arm frame disclosed by the invention, the strength of the structure can be ensured while light weight is realized. The production efficiency of the rocker arm frame is effectively improved, and the structure of the valve rod supporting position is improved.

6 Claims, 5 Drawing Sheets

LIGHTWEIGHT ROCKER ARM FRAME AND CURVED CROWN PART FORMING PROCESS THEREOF

TECHNICAL FIELD

The invention relates to the technical field of engine accessory manufacturing, particularly to a lightweight rocker arm frame and a curved crown part forming process thereof.

BACKGROUND OF THE INVENTION

With the increase in the driving speeds of the automobiles and the increasing attention towards environmental protection, the innovation in the engine technology is developing in the direction of making engines having light weight, high efficiency, energy conservation and emission reduction. The gas distribution mechanism is an important part of an automobile engine. Since the rocker arm frame serves as a key part of the gas distribution mechanism, improvements in the structure of the rocker arm frame have important significance on the development of the engine.

As shown in FIG. 1, the rocker arm frame structure in the prior art is formed by stamping a metal plate. One end of the rocker arm frame is a ball socket, and the other end of the rocker arm frame is a curved crown part serving as a valve bearing surface. The structure of the curved crown part has a "W" shape, and the sidewall needs to be bent by 180 degrees during forming. The traditional forming process is that the plate material is firstly bent to form a "U" shape, which is then extruded and folded upwards to form a "W" shape. The defects of the existing structure are as below:

1. The local stretching and thinning phenomenon of the sidewall is serious, which influences the structural strength, resulting in the risk of fatigue fracture.
2. A gap exists between the two sidewalls which are not attached to each other, so the rigidity is poor and vibration noise can be generated during working, affecting normal operations of the engine.
3. More material is needed to fold the curved crown of the rocker arm frame, and thus the requirement for lightweight of the existing engine cannot be met.
4. The rocker arm frame forming process is complex and the cost is relatively high.

SUMMARY OF THE INVENTION

The invention aims to solve the problems in the prior art, and provide a novel lightweight rocker arm frame and a curved crown part forming process thereof. The structure of the curved crown part of the rocker arm frame does not need to go through U-shaped bending, extrusion, or folding. Instead, the sidewalls of the rocker arm frame are directly extruded to form the extruded sidewalls of the curved crown of the rocker arm frame. The strength of the original structure is enhanced while the light weight is achieved, greatly simplifying the forming process and saving the cost.

In order to achieve the above objectives, the technical solutions used by the invention are as follows:

A novel lightweight rocker arm frame, comprising: two sidewalls and two bottom plates, wherein the two sidewalls are connected through the bottom plates respectively located at two ends; a ball socket protruded upwards and an oil hole are arranged at a bottom plate at one end, and a bottom surface of a bottom plate at the other end is a bearing surface; a pin shaft hole is formed in the middle of each sidewall without the bottom plates; wherein an outer side of each sidewall where the bearing surface is located is provided with a groove formed through extrusion, and extruded sidewalls are formed on two sides of a bottom of the bottom plate. The gas distribution mechanism further includes a hydraulic tappet, a cam assembly, and a valve assembly. The ball socket part is used for connecting to a ball head of the hydraulic tappet. The pin shaft hole is used for installing the roller bearing assembly through the pin shaft. The roller bearing assembly is in rolling connection with the cam assembly, and the bearing surface is in sliding connection with the valve rod in the valve assembly. Wherein, the extruded sidewall is used for preventing the valve rod from falling off during the rapid operation process of the engine, the height of the extruded sidewall can be adjusted according to the specific engine structure.

Preferably, the bottom plates are connected to bottoms of the sidewalls, namely, the rocker arm frame is of a U-shaped structure integrally. The extruded sidewall is formed by downward flowing and extrusion of the sidewall material forming the groove, so that the whole material of the rocker arm frame is saved, the weight is lighter, and the purpose of having a lightweight structure is achieved.

Preferably, the bearing surface is a downward-protruding curved surface structure, so that the friction is reduced when the valve rod and the bearing surface are sliding.

Preferably, a distance between two extruded sidewalls is adjustable and smaller than a distance between the two sidewalls. Hence, the lateral displacement of the valve rod can be well limited, so that the situation that the curved crown part of an existing rocker arm frame needs to be bent and then extruded and contracted laterally is avoided, thus, simplifying the process. Meanwhile, the distance between the two extruded sidewalls can be flexibly adjusted according to the actual structure.

Preferably, the groove is a vertically-through groove structure or a non-through groove. The length dimension of the groove can be adjusted according to actual needs.

A forming process of the above curved crown part of a novel lightweight rocker arm frame, comprising:

a first step: integrally forming a rocker arm frame main body by a stamping process, and forming a U-shaped basic structure on the curved crown part of the rocker arm frame after an extrusion and blanking;

a second step: forming a preliminary extruded groove by extruding an outer surface of each sidewall of the curved crown part inwards:

a third step: continuously extruding the preliminary extruded groove, so that material flows upwards and is stacked to form a long extruded groove, so as to form bearing surface protrusions on two sides of the bearing surface;

a fourth step: extruding the bearing surface protrusions by a mold, so that heights of bearing surface protrusions are increased to form bearing surface sidewalls.

In the process, the extruded long groove can finally be a vertically-through groove-shaped structure, and can also be a non-through structure.

The invention has the following advantages:

1. The curved crown part is integrally formed, enlarging the minimum cross section width of the curved crown part, effectively enhancing the overall structural strength of the rocker arm frame, and reducing the risk of structural fatigue fracture.

2. The curved crown part is provided with an extruded groove in the sidewall. With the method of forming the extruded sidewalls by the natural flow and accumulation of the material, the gap between the sidewalls caused by folding of material can be effectively avoided.

3. The size of the extruded groove can be adjusted according to the actual structural requirements, so that the height of the extruded sidewalls formed by extrusion can be adjusted accordingly. Different sidewall heights can be set according to the actual engine structure, and the structure is more flexible. A sufficient height of the extruded sidewall can ensure that the valve is unlikely to fall off when the engine is working quickly.

4. The extruded sidewall is formed by extruding the structure, and the redundant material due to folding of material is saved, so that the material of the rocker arm frame is saved, and the overall structure is lighter. Thus, the purpose of having a lightweight structure is achieved.

5. The structure of a curved crown part of an existing rocker arm is changed, and the process in which the material is bent and lateral extruded is not used anymore.

6. The rocker arm frame has a simpler forming process and a smaller rotational inertia under the condition of the same rocker arm ratio.

7. The rocker arm frame has universality. The problem of the interference of sidewalls of the rocker arm frame is avoided, and the rocker arm frame is applicable to almost all the engines.

In the figures: 1, sidewall; 2, bottom plate; 3, bearing surface; 4, ball socket; 5, oil hole; 6, groove; 6.1, non-through groove; 6.2, preliminary extruded groove; 6.3, long extruded groove; 7, extruded sidewall; 7.1, bearing surface protrusion; 8, pin shaft hole.

DETAILED DESCRIPTION OF THE INVENTION

The present invention is further described by the following embodiments and the accompanying drawings.

Figure 1:
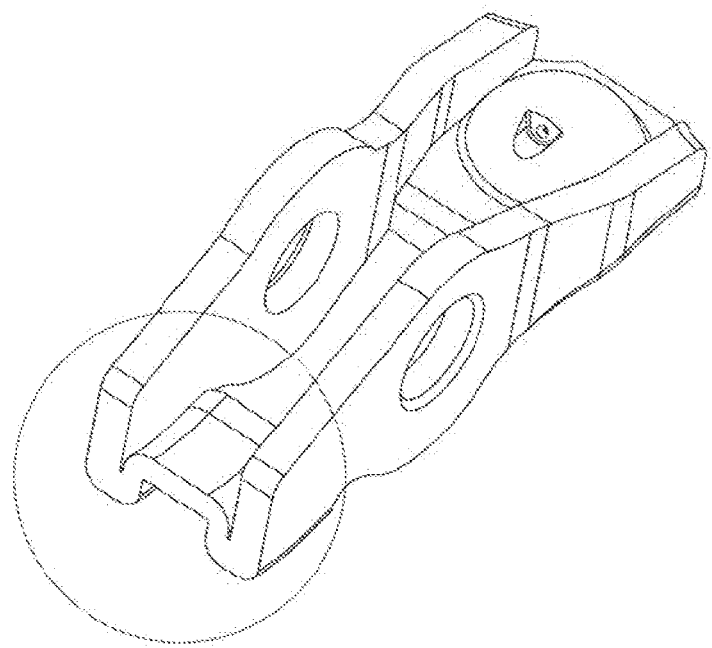
FIG. 1 is a schematic structural diagram of a rocker arm frame in the prior art.

As shown in FIG. 1, the structure of a rocker arm frame in the prior art is provided. The curved crown part of the rocker arm frame is W-shaped. The forming process is that the plate material is firstly bent to form a U shape, which is then extruded and folded upwards to form a W shape. The defects of the forming process are that the side plate of the rocker arm frame becomes much thinner at the stretching position, so that the structural strength is influenced, resulting in the risk of fatigue fracture. Further, more material is used for folding and forming, the rotational inertia is large, failing to meet the requirement of light weight. Additionally, the depth of the W-shaped valve assembly bearing surface is small and has a gap. In the working state of the engine, particularly, when the valve assembly and the roller rocker arm are cold started, the valve rod has the risk of falling off.

Figure 2:
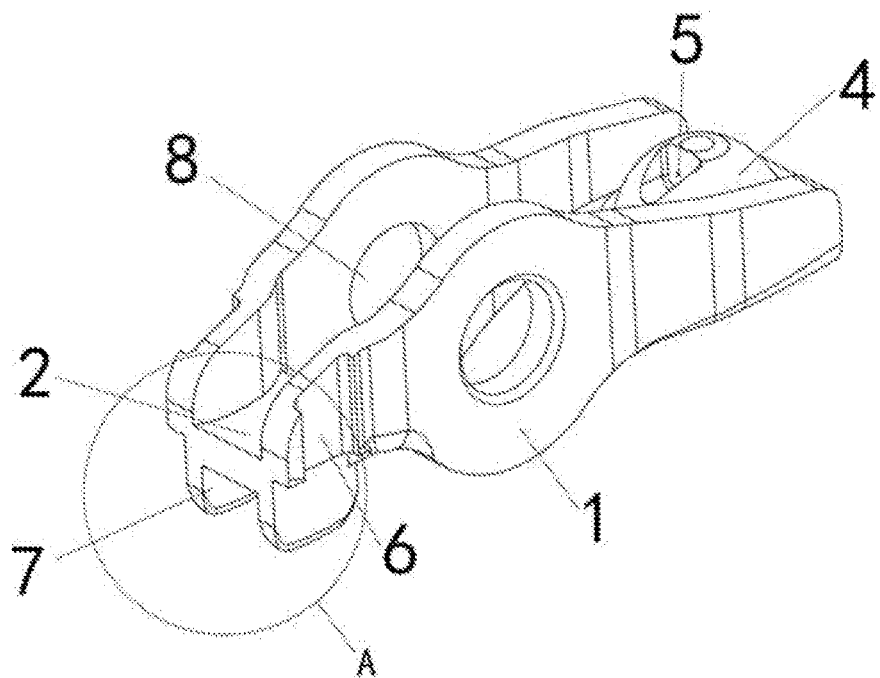
FIG. 2 is a schematic structural diagram of a rocker arm frame according to the invention.
Figure 4:
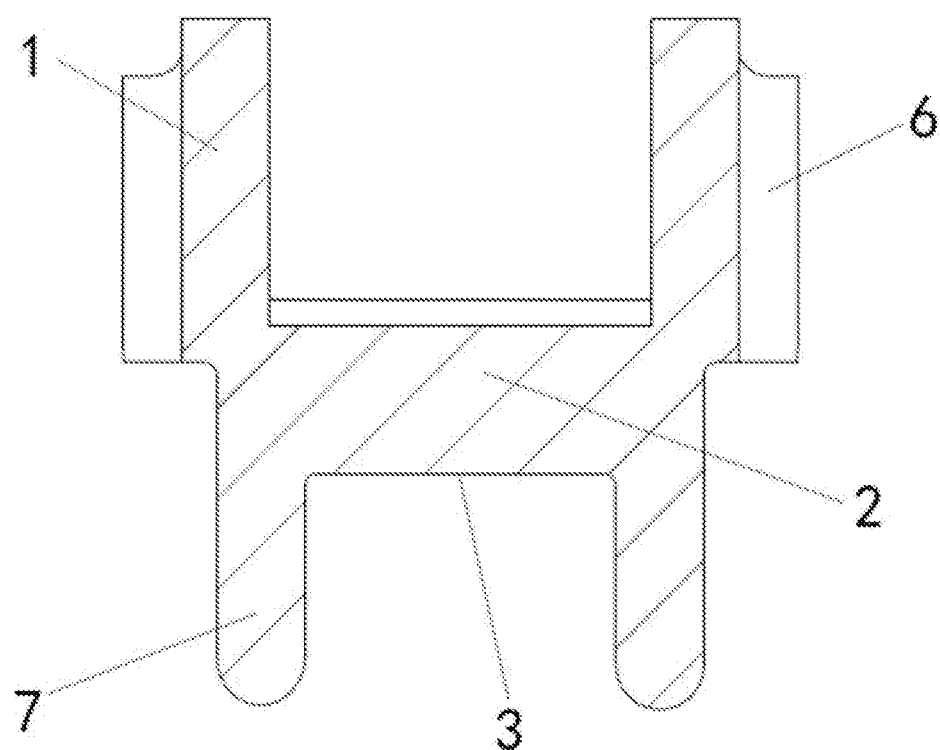
FIG. 4 is a cross-sectional view of the position A in FIG. 2.
Figure 5:
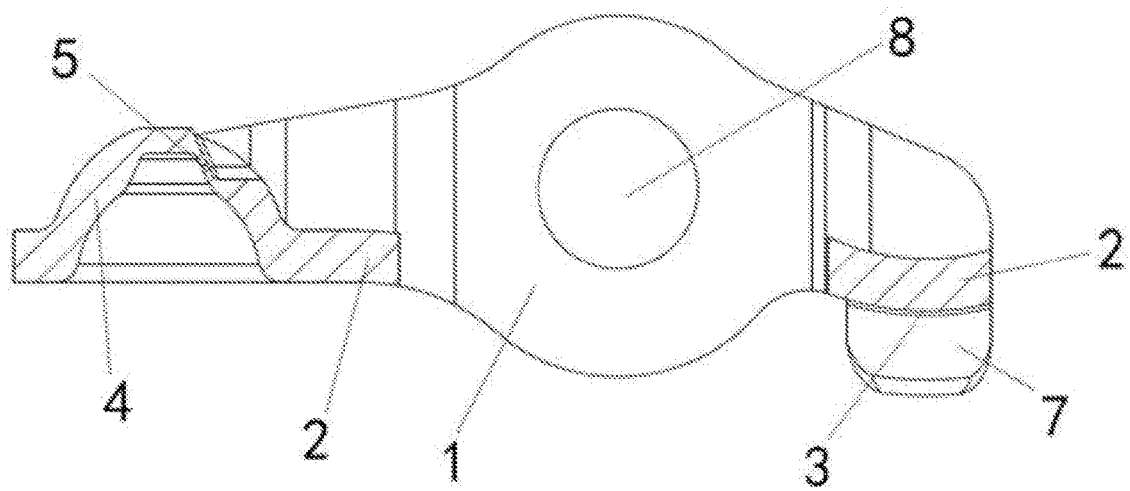
FIG. 5 is a cross-sectional view of a rocker arm frame according to the invention.

According to an embodiment of the invention, as shown in FIG. 2, FIG. 4 and FIG. 5, the novel lightweight rocker arm frame includes two sidewalls 1 and two bottom plates 2. The two sidewalls 1 are connected through bottom plates 2 respectively located at the bottoms of the two ends. The whole structure of the rocker arm frame is of a U shape. The bottom plates 2 and the sidewalls 1 of the rocker arm frame are integrally formed by a material. A ball socket 4 protruded upwards and an oil hole 5 are arranged at the bottom plate 2 at one end, and the bottom surface of the bottom plate 2 at the other end is a bearing surface 3. Pin shaft holes 8 are formed in the sidewalls 1 without the bottom plates 2 in the middle. The outer sides of the sidewalls 1 where the bearing surface 3 is located are provided with a groove 6 formed through extrusion in the vertical direction. Extruded sidewalls 7 are formed on the two sides of the bottom of the bottom plate 2. Hence, the distance between the two extruded sidewalls 7 is generally smaller than the distance between the two sidewalls 1. In addition, the bearing surface 3 is a downward-protruding curved surface structure, namely, the bottom plate 2 where the bearing surface 3 is located has a downward radian.

Figure 3:
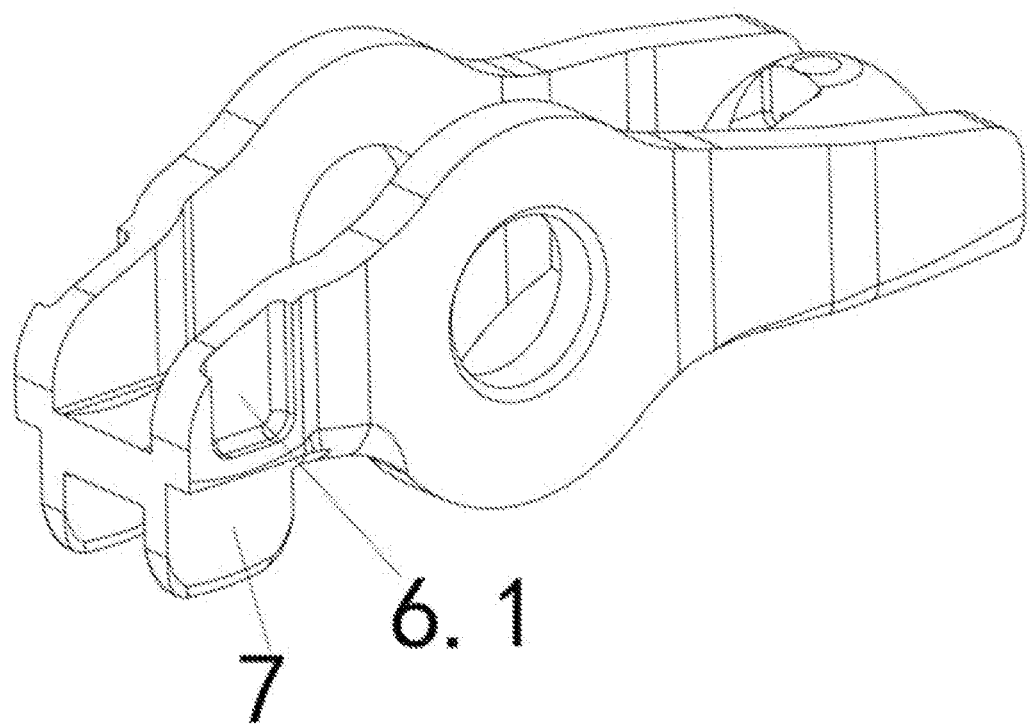
FIG. 3 is a schematic diagram of a rocker arm frame with a non-through groove according to the invention.

Compared with the prior art, the extrusion forming process is simple and rapid, and the forming efficiency of the rocker arm frame is greatly improved. The material is effectively utilized, and the redundant material formed by folding the material of the W-shaped structure is avoided, so that the whole material of the rocker arm frame is saved, the weight is lighter, and the purpose of the lightweight structure is achieved. Further, the structural strength is high, and the risk of structural fatigue fracture is greatly reduced. In addition, the extruded areas of the grooves 6 on the sidewalls 1 are selected according to requirements, and the grooves 6 can go through the sidewalls 1, or fail to go through the sidewalls 1. FIG. 2 shows the sidewall 1 provided with through grooves 6, while FIG. 3 shows the sidewall 1 provided with non-through grooves 6.1, so that the heights of the extruded sidewalls 7 can be further adjusted according to the specific engine structure, which is more flexible, wide in applicability and has enough height capable of preventing the valve rod from falling off during the rapid operation process of the engine.

Figure 6:
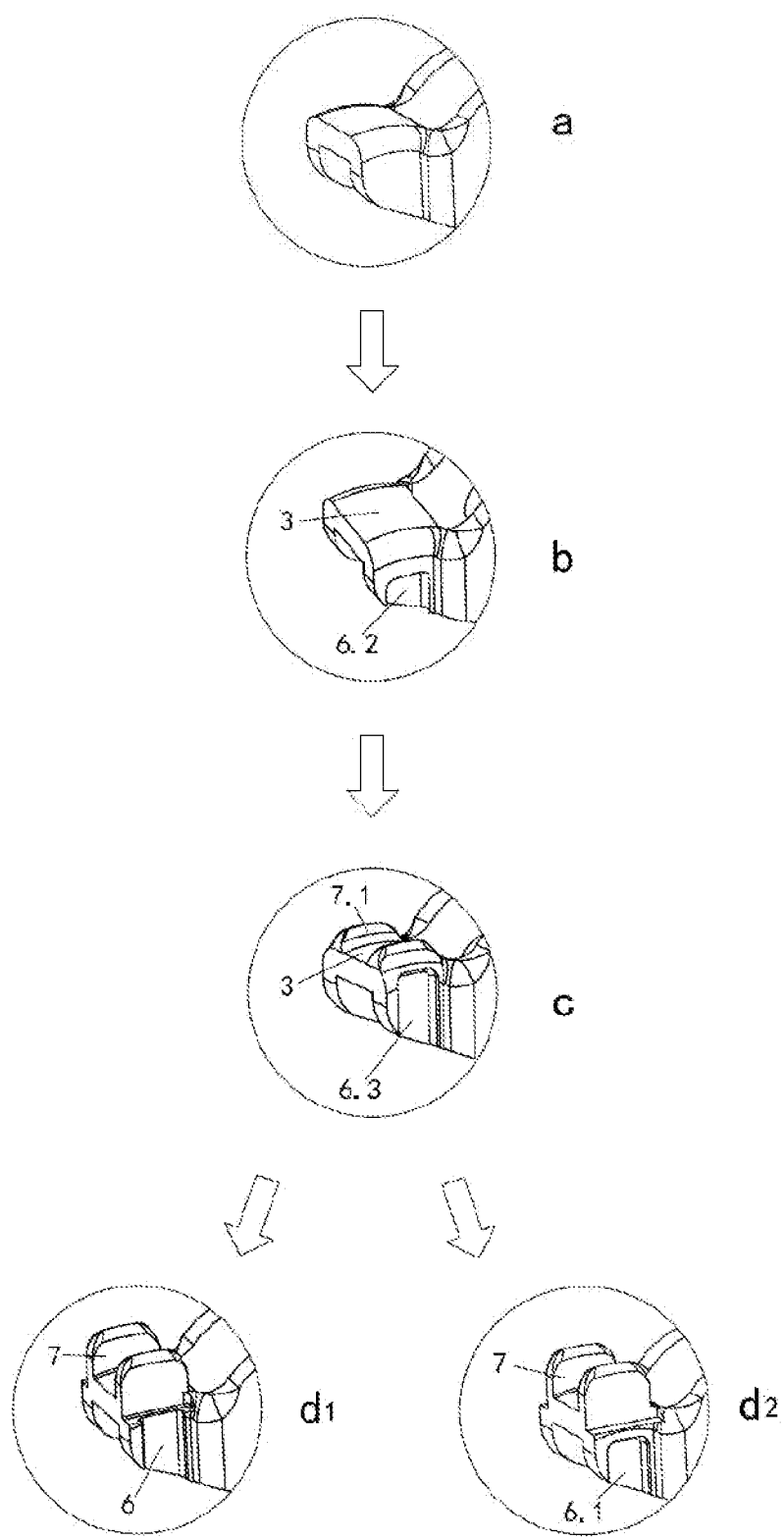
FIG. 6 is a schematic diagram of a curved crown part forming process according to the invention.

As shown in FIG. 6, a forming process of a curved crown part of a novel lightweight rocker arm frame disclosed by the invention includes the following steps:

The first step: As shown at position a in FIG. 6, a rocker arm frame main body composed of two sidewalls 1 and two bottom plates 2 is integrally formed by a stamping process. A ball socket 4, an oil hole 5, pin shaft holes 8 and the like are formed on the sidewalls 1 and the bottom plate 2;

The second step: As shown at position b in FIG. 6, the outer surfaces of the sidewalls 1 of the curved crown part are extruded inwards to form preliminary extruded grooves 6.2 with a smaller size;

The third step: As shown at position c in FIG. 6, the preliminary extruded grooves 6.2 are continuously extruded, so that the material flows upwards and is stacked. The sizes of the preliminary extruded grooves 6.2 are increased to form long extruded grooves 6.3, and bearing surface protrusions 7.1 are formed on the two sides of the bearing surface 3.

The fourth step: As shown at position d in FIG. 6, the bearing surface protrusions 7.1 are extruded by a mold, so that the heights of the bearing surface protrusions 7.1 are increased to form bearing surface sidewalls 7.

The height of the sidewalls 7 of the extruded bearing surface is adjusted according to actual conditions, and the amount of extruded material on the sidewalls 1 of the curved crown part can be adjusted accordingly. The vertically-through groove structures 6 as shown at the position d1 in FIG. 6 can be finally formed from the long extruded grooves 6.3. Alternatively, non-through grooves structures 6.1 as shown at the position d2 in FIG. 6 can also be formed.

The above description is only related to specific embodiments of the invention, but the structure of the invention is not limited thereto. The invention can be applied to similar products. The changes or modifications made by any technical personnel in the field of the invention all fall within the scope of the invention.

We claim:

1. A novel lightweight rocker arm frame, comprising:
   a first sidewall, a second sidewall,
   a first bottom plate, a second bottom plate, a first end and a second end;
   wherein
   the first sidewall and the second sidewall are connected through the first bottom plate located at the first end and the second bottom plate located at the second end;
   a ball socket protruded upwards and an oil hole are arranged at the first bottom plate at the first end, and a bottom surface of the second bottom plate at the second end is a bearing surface;
   a pin shaft hole is formed in the middle of each of the first sidewall and the second sidewall without the first bottom plates and the second bottom plate;
   an outer side of the first sidewall and an outer side of the second sidewall where the bearing surface is located is respectively provided with a groove formed through extrusion; and
   a first extruded sidewalls is formed on a first side of a bottom of the second bottom plate at the second end, and a second extruded sidewall is formed on a second side of the bottom of the second bottom plate at the second end.

2. The novel lightweight rocker arm frame of claim 1, wherein the first bottom plate and the second bottom plate are connected to bottoms of the first sidewall and the second sidewall.

3. The novel lightweight rocker arm frame of claim 1, wherein the bearing surface is a downward-protruding curved surface structure.

4. The novel lightweight rocker arm frame of claim 1, wherein a distance between the extruded sidewalls is adjustable and smaller than a distance between the first sidewall and the second sidewall.

5. The novel lightweight rocker arm frame of claim 1, wherein the groove is a vertically-through groove structure or a non-through groove.

6. A forming process of a curved crown part of a novel lightweight rocker arm frame, comprising:
   a first step: integrally forming a rocker arm frame main body by a stamping process, and forming a U-shaped basic structure on a curved crown part of the rocker arm frame main body after an extrusion and blanking;
   a second step: forming a preliminary extruded groove by extruding an outer surface of each sidewall of the curved crown part inwards;
   a third step: continuously extruding the preliminary extruded groove, so that material flows upwards and is stacked to form a long extruded groove, so as to form bearing surface protrusions on two sides of a bearing surface; and
   a fourth step: extruding the bearing surface protrusions by a mold, so that heights of the bearing surface protrusions are increased to form bearing surface sidewalls.

* * * * *